US006559213B2

(12) United States Patent
Wesch

(10) Patent No.: US 6,559,213 B2
(45) Date of Patent: May 6, 2003

(54) PLASTISOL COMPOSITION

(75) Inventor: Karl Wesch, Waldbrunn (DE)

(73) Assignee: Henkel-Teroson GmbH, Heidelberg (DE)

( * ) Notice: Subject to any disclaimer, the term of this patent is extended or adjusted under 35 U.S.C. 154(b) by 0 days.

(21) Appl. No.: 09/855,318

(22) Filed: May 15, 2001

(65) Prior Publication Data

US 2001/0044486 A1 Nov. 22, 2001

Related U.S. Application Data

(63) Continuation of application No. 08/913,560, filed as application No. PCT/EP96/00986 on Mar. 8, 1996, now abandoned.

(51) Int. Cl.$^7$ ............................................. C08K 5/101
(52) U.S. Cl. .................... 524/318; 524/315; 524/296; 524/297; 524/569
(58) Field of Search ....................... 264/302; 554/219, 554/223, 224; 524/296, 297, 315, 318, 141, 569

(56) References Cited

U.S. PATENT DOCUMENTS

| | | | |
|---|---|---|---|
| 2,274,555 A | | 12/1942 | Japs |
| 2,485,910 A | | 10/1949 | Myers et al. |
| 2,563,485 A | * | 8/1951 | Pollack ................. 524/318 |
| 2,615,858 A | * | 10/1952 | Winkler ................. 524/318 |
| 2,852,482 A | | 9/1958 | Graham |
| 2,891,084 A | * | 6/1959 | Alm et al. ................. 554/223 |
| 3,194,822 A | * | 7/1965 | Neiswender et al. ......... 554/223 |
| 3,216,068 A | | 11/1965 | Williams |
| 3,390,115 A | * | 6/1968 | Hagemeyer et al. ........ 260/31.6 |
| 3,409,580 A | | 11/1968 | Alzner et al. |
| 3,423,357 A | * | 1/1969 | Suh ............................. 524/318 |
| 3,444,281 A | | 5/1969 | Cahill et al. |
| 3,627,707 A | | 12/1971 | Giessler |
| 3,676,472 A | * | 7/1972 | Zilliken et al. ............. 554/223 |
| 3,925,528 A | | 12/1975 | Muller et al. |
| 4,210,567 A | | 7/1980 | Kösters |
| 4,232,076 A | | 11/1980 | Stetson et al. |
| 4,309,331 A | * | 1/1982 | Graham ................. 260/30.6 R |
| 4,464,502 A | | 8/1984 | Jacobs |
| 4,465,572 A | * | 8/1984 | Graham ................. 204/159.16 |
| 4,887,732 A | * | 12/1989 | Matsubayashi et al. ....... 428/64 |
| 4,957,955 A | | 9/1990 | Saur et al. |
| 5,340,495 A | * | 8/1994 | Mulcahy et al. ............. 252/162 |
| 5,362,787 A | * | 11/1994 | Ngoc et al. ............... 427/385.1 |
| 5,741,824 A | | 4/1998 | Butschbacher et al. |
| 5,985,812 A | * | 11/1999 | Ehrenkrona ................. 554/223 |

FOREIGN PATENT DOCUMENTS

| | | |
|---|---|---|
| AU | 3 725 068 | 11/1969 |
| CA | 1 050 683 | 3/1979 |
| CH | 223 079 | 8/1942 |
| DE | 19 10 911 | 11/1970 |
| DE | 24 54 235 | 5/1976 |
| DE | 25 29 732 | 1/1977 |
| DE | 40 34 725 | 5/1992 |
| DE | 43 15 191 | 12/1994 |
| DE | 195 31 849 | 3/1996 |
| EP | 559 254 | 9/1993 |
| JP | 242832 | * 9/1990 |

OTHER PUBLICATIONS

J. Oil Col. Chem. Assoc. 57:161–69 (1974).
"Polyvinylchlorid", Kunststoffhandbuch 2/1(2), Chap 6.7, p631 (1985).
DIN 53504.
Ritchie, D.D. "Plasticizers Stabilizers and Fillers" p. 151–152 (1972).

* cited by examiner

Primary Examiner—Peter Szekely
(74) Attorney, Agent, or Firm—Stephen D. Harper; Michael E. Carmen

(57) ABSTRACT

Monoesters of fatty acids containing at least 12 carbon atoms may replace a considerable percentage of conventional plasticizers based on phthalic acid esters, alkyl sulfonic acid esters of phenol or other known plasticizers in plastisol compositions. The methyl and/or ethyl esters of fatty acids of renewable fats and oils, such as tall oil fatty acids, rapeseed oil fatty acids, linseed oil fatty acids or safflower oil fatty acids, are preferably used for these secondary plasticizers. These plastisols are preferably used as adhesives, sealing materials or coatings in automobile construction.

22 Claims, No Drawings

PLASTISOL COMPOSITION

This application is a continuation of U.S. application Ser. No. 08/913,560, filed Oct. 17, 1997, now abandoned, which claims priority under 35 U.S.C. §371 to PCT International Application No. PCT/EP96/00986, filed Mar. 8, 1996, which claims priority to German Application Number DE 195 09 085.3 filed Mar. 16, 1995.

This invention relates to plastisol compositions containing monoesters of fatty acids bearing at least 12 carbon atoms, to a process for their production and to their use.

BACKGROUND OF THE INVENTION

Plastisols are generally dispersions of organic polymers in plasticizers which gel on heating to relatively high temperatures and cure on cooling to form the plastigel. Today, the most widely used plastisols in practice by far predominantly contain finely powdered polyvinyl chloride, copolymers of vinyl chloride and, more recently, methacrylate copolymers or styrene copolymers. These finely powdered polymers are dispersed in a liquid plasticizer and form the paste-like plastisol. Corresponding plastisols are used for various applications. They are used, for example, as sealing compounds, for impregnating and coating substrates of textile materials, as cable insulations and as adhesives. In the automotive industry, plastisols are used for underbody protection, for sealing seams, for lining hoods, as vibration-damping materials or as adhesives. Depending on the particular application envisaged, the plastisols contain other additives in addition to the fine-particle polymer powders and the liquid plasticizers. These other additives include, for example, fillers, coupling agents, stabilizers, flow aids, water-absorbing substances, pigments or blowing agents.

The plasticizers used, or suitable for use, in plastisol technology may be classified according to various aspects, the clearest classification being based on the chemical product classes of the plasticizers, such as phthalates, epoxides, aliphatic dicarboxylic acid esters, phosphates, polyesters, special plasticizers, extenders (hydrocarbons, chlorinated hydrocarbons). Most industrially used plasticizers are chemically stable diesters and triesters of aromatic or aliphatic di- and tricarboxylic acids. In a few cases, non-ester-like compounds with a plasticizing effect are also used. Phthalic acid diesters are by far the most widely used, especially for PVC homopolymers and copolymers, because hitherto they have been inexpensively available in large quantities. According to H. K. Felger (Editor), Kunststoffhandbuch "Polyvinylchlorid", Vol. 2/1, 2nd Edition 1985, Chapter 6.7, the particularly inexpensive dioctyl phthalates (di-2-ethylhexyl phthalate or diisooctyl phthalate) have hitherto enjoyed a dominant market share. However, because they may possibly be harmful to health, considerable efforts are being made worldwide to replace them by other plasticizers. Other common phthalate plasticizers are the various isomeric diisononyl phthalates, diisodecyl phthalates and diundecyl phthalates. The phthalic acid esters of $C_8/C_{10}$ alcohols or $C_7/C_{11}$ alcohols are also frequently used. However, these plasticizers have become considerably more expensive than the dioctyl phthalates, especially in recent years. Although the aliphatic dicarboxylic acid esters, especially the diadipates, diazelates and disebacates, have excellent low-temperature properties, they are only used in special cases on account of their high price. The same applies to the phosphate plasticizers, to the polyester plasticizers and to the other special plasticizers such as, for example, esters of terephthalic acid, trimellitic acid, pyromellitic acid, citric acid and the alkyl sulfonic acid esters of phenol and cresol.

To reduce costs, the hitherto known extenders or secondary plasticizers, largely hydrocarbons, are only used in admixture with primary plasticizers. Unfortunately, on account of their high volatility and their adverse affect on compatibility, the hitherto known extender plasticizers can only be used to a very limited extent and are employed almost exclusively to reduce the viscosity the plastisol pastes in order to guarantee their sprayability, especially by the airless process.

Accordingly, the problem addressed by the present invention was to find substances which would be suitable as least as secondary plasticizers, which would be physiologically safe and which would be economically available in sufficient quantities. They would preferably be based on renewable materials.

DETAILED DESCRIPTION OF THE INVENTION

It has now surprisingly been found that monoesters of monocarboxylic acids containing at least 12 carbon atoms can replace the phthalic acid esters hitherto used in PVC plastisols by up to 50% without any adverse effect on adhesion, stability in storage, tensile strength, elongation or resistance to water of condensation. This is all the more surprising insofar as, according to popular expert opinion, the esters of monocarboxylic acids are regarded as too volatile, too sensitive to water and too lacking in gelability to be able to be used as plasticizers. On this very subject, it is stated, for example, in Kunststoffhandbuch, Vol. 2/1, page 631, that the relatively long-chain esters of fatty acids are also attended by compatibility problems so that they cannot be classed as plasticizers for PVC. They have a certain significance as low-temperature plasticizers, secondary plasticizers and as lubricants in the processing of rigid and flexible PVC. However, particularly where they are used as lubricants, they only added to the PVC mixtures in very small quantities and are even expected to be incompatible with the polymer because it is known that these lubricants are supposed to migrate to the phase interface to develop an anti-adhesive effect during the extrusion process and other processing steps. There are no references in the Kunststoff-handbuch to the use of the monoesters of monocarboxylic acids of fatty acids containing at least 12 carbon atoms in PVC plastisols, particularly those which are supposed to have a good adhesive effect on coated and uncoated metal plates.

Secondary plasticizers suitable for use in accordance with the invention are basically any $C_{1-6}$ alkyl esters of monocarboxylic acids containing at least 12 carbon atoms. Since the fatty acids for the monoesters preferably emanate from natural sources, they are generally mixtures of saturated and predominantly unsaturated fatty acids with different chain lengths. Dimethyl esters and/or ethyl esters of tall oil fatty acids, rapeseed oil fatty acids, linseed oil fatty acids and/or safflower oil fatty acids are most particularly preferred. The secondary plasticizers are ordinarily present in the plastisol composition of this invention in an amount of from about 14 to about 71 parts by weight per 100 parts of resin (phr).

Suitable primary plasticizers for the plastisols according to the invention are basically any standard plasticizers, including for example the $C_{6-14}$ dialkyl esters of phthalic acid, alkyl benzyl esters of phthalic acid, benzoates of difunctional or trifunctional polyols, for example dipropylene glycol dibenzoate, alkyl sulfonic acid esters of phenol and cresol, aryl phosphates, alkyl phosphates, $C_{6-14}$ diesters of aliphatic $C_{4-10}$ dicarboxylic acids and/or polymer plasticizers based on diols and dicarboxylic acids and mixtures thereof. The ratio of secondary plasticizer to primary plasticizer is from 0.02:1 to 2:1 and preferably from 0.07:1 to 0.06:1. On account of the possibly health-damaging effect, however, the plastisols according to the invention preferably contain no dioctyl phthalate or dibutyl phthalate.

The other constituents of the plastisols according to the invention are known per se. They are used in the form of fine-particle polymer powders, preferably polyvinyl chloride homopolymers and/or vinyl chloride/vinyl acetate copolymers with a vinyl acetate content of up to 20% by weight, based on the copolymer. These PVC powders are normally produced as so-called paste types by emulsion polymerization or microsuspension polymerization. Suspension polymers, which are also known as extender polymers, may be used in addition to or instead of these paste types.

The methacrylate copolymers known from DE-B-24 54 235 and DE-B-25 29 732 and the styrene copolymers known from DE-A-40 34 725 and DE-A-43 15 191 may also be used for the plastisols according to the invention.

The plastisols according to the invention may also contain the auxiliaries and additives known in plastisol technology, including for example epoxide plasticizers, preferably epoxidized natural oils, such as epoxidized soybean oil, epoxidized linseed oil or epoxidized tall oils. These epoxy plasticizers are known to be used in small quantities as heat stabilizers, especially in PVC plastisols.

Any of the fillers typically used and known per se in plastisol technology may be used as fillers. Examples of suitable fillers are limestone powder, natural ground chalks (calcium carbonates or calcium magnesium carbonates), precipitated chalks, heavy spar, talcum, mica, clays, pigments, for example titanium dioxide, carbon black, iron oxides. The plastisols may additionally contain standard antiagers and stabilizers, rheology aids, for example pyrogenic silicas, Bentones, castor oil derivatives. In addition, so-called hollow microbeads may be used for the production of plastisols of low specific gravity. In addition, blowing agents may optionally be added to the plastisols where they are to be foamed during the gelation process. Suitable blowing agents are any blowing agents known per se, preferably organic blowing agents from the class of azo compounds, N-nitroso compounds, sulfonyl hydrazides or sulfonyl semicarbazides.

Azo-bis-isobutyronitrile and, in particular, azodicarbonamide are mentioned as examples of azo compounds while dinitrosopentamethylene tetramine is mentioned as an example of a nitroso compound. 4,4'-Hydroxy-bis-(benzenesulfonic acid hydrazide) is mentioned as an example of a sulfohydrazide while p-toluenesulfonyl semicarbazide is mentioned as an example of a semicarbazide.

Foamed plastisols can also be obtained by using thermoplastic microspheres. Thermoplastic microspheres contain a liquid blowing agent based on aliphatic hydrocarbons or fluorocarbons as core and a shell of a copolymer of acrylonitrile with vinylidene chloride and/or methyl acrylate and/or methacrylonitrile. Where microspheres such as these are used, they expand and hence cause the plastisols to foam during the gelation process. The use of microspheres is described, for example, in EP-A-559 254.

In many applications, coupling agents have to be added. Various polyaminoamides based on polymerized or dimerized fatty acids, epoxy resins, optionally in combination with hot-curing crosslinking agents (for example dicyanodiamide), phenolic resins, terpene/phenol resins and (blocked) diisocyanates or polyisocyanates may be used as coupling agents. Polyaminoamides based on polyamines and dimerized or polymerized fatty acids are preferably used. The coupling agents are normally used in quantities of 0.01 to 5% by weight, based on the plastisol formulation as a whole.

Accordingly, the plastisol compositions normally consist of a) 5 to 50% by weight of at least one powder-form polymer, b) 5 to 65% by weight of a plasticizer mixture of primary plasticizer and secondary plasticizer, the ratio of secondary plasticizer to primary plasticizer being from 0.02:1 to 2:1 and preferably from 0.07:1 to 0.6:1, c) 0 to 50% by weight of fillers, d) 0.01 to 5% by weight of a coupling agent, e) optionally other reactive additives and other auxiliaries and additives, the sum total of the individual components being 100% by weight.

The plastisols according to the invention are particularly suitable for use on metallic substrates in painted or unpainted form, especially in automobile construction. In automobile construction, the plastisols according to the invention are used as underbody protection, as hood antiflutter adhesives, as sill protection compounds, as spot welding pastes and for other adhesive applications. They may also be used to seal weld seams or flanged seams and as acoustically active coatings ("anti-vibration compounds").

The invention is illustrated by the following Examples which are intended to illustrate the effect of the individual parameters on the present invention without limiting the invention in any way.

The quantities mentioned in the following Examples are parts by weight unless otherwise specifically stated.

EXAMPLES 1 to 4, COMPARISON EXAMPLE

In the following plastisol compositions, the individual components were stirred in vacuo in a planetary mixer with intensive shearing until the composition was homogeneous.

TABLE 1

| Example | 1 | 2 | 3 | 4 | Comp. |
|---|---|---|---|---|---|
| PVC Homopolymer[2] | 17.0 | 17.0 | 17.0 | 17.0 | 17.0 |
| PVC Homopolymer[2] | 4.0 | 4.0 | 4.0 | 4.0 | 4.0 |
| Diisononyl phthalate | 37 | 34 | 30 | 25 | 40.0 |
| Petroleum 190/250 | 3 | 3 | 3 | 3 | 5.0 |
| Rapeseed oil methyl ester[3] | 3 | 6 | 10 | 15 | — |
| Chalk, ground[4] | 12.37 | 12.37 | 12.37 | 12.37 | 12.37 |
| Calcium oxide | 1.5 | 1.5 | 1.5 | 1.5 | 1.5 |
| Zinc oxide | 0.2 | 0.2 | 0.2 | 0.2 | 0.2 |
| Carbon black paste | 0.03 | 0.03 | 0.03 | 0.03 | 0.03 |
| Chalk, precipitated[5] | 13.6 | 13.6 | 13.6 | 13.6 | 13.6 |
| Chalk, precipitated[6] | 5.0 | 5.0 | 5.0 | 5.0 | 5.0 |
| Silica, highly disperse | 0.5 | 0.5 | 0.5 | 0.5 | 0.5 |
| Polyaminoamide[7] | 0.8 | 0.8 | 0.8 | 0.8 | 0.8 |
| Viscosity [Pa · s][8] | 1.38 | 0.97 | 0.83 | 0.65 | 1.30 |
| Yield point [Pa · s][8] | 210 | 172 | 153 | 142 | 175 |
| Shore hardness A | 44 | 43 | 44 | 45 | 44 |
| Adhesion | V. Good | V. Good | V. Good | V. Good | V. Good |

TABLE 1-continued

| Example | 1 | 2 | 3 | 4 | Comp. |
|---|---|---|---|---|---|
| Exudation | No | No | No | No | No |
| Tensile strength [N/mm$^2$] | 1.87 | 1.99 | 1.96 | 2.0 | 2.04 |
| Breaking elongation [%] | 195 | 190 | 176 | 162 | 190 |

[1] Emulsion polymer, paste type, K-value 72
[2] Suspension polymer, K-value 65
[3] Synonym: rapeseed oil fatty acid methyl ester prepared by transesterification of rapeseed oil, acid value 1, saponification value about 190, iodine value about 110
[4] Natural ground chalk, average particle size 2μ
[5] Precipitated stearate-coated chalk, average particle size 2.5μ
[6] Precipitated chalk, average particle size 2.0μ
[7] Basis: dimer fatty acid, diethylenetriamine, amine value about 240
[8] Rheomat 115, measuring system 114.

To evaluate the gelled plastisols, the compositions mentioned above were gelled for 30 minutes at 165°.

To test adhesion, ribbons were applied to cataphoretically coated plates and subjected to the stoving conditions mentioned above. This was followed by adhesion testing in a manual peel test. After storage for 1 week at room temperature, the gelled samples were examined to determine whether any liquid had exuded to the surface of the plastigel. Tensile strength and breaking elongation were determined in accordance with DIN 53504 on gelled plastisol strips measuring 10×1×100 mm at a tear rate of 100 mm/min.

As can be seen from the above tests, the performance properties of the plastigel, even with high percentage contents of rapeseed oil methyl ester in the formulations (Example 4), are equivalent to those of the known plastigel which does not contain any rapeseed oil methyl ester.

EXAMPLES 5 to 8

In the Examples set out in Table 2, a test was conducted on a simplified formulation to determine whether other conventional plasticizers could be partly replaced by rapeseed oil methyl ester in plastisols.

TABLE 2

| Example | 5 | 6 | 7 | 8 |
|---|---|---|---|---|
| PVC Homopolymer, paste type | 30 | 30 | 30 | 30 |
| Chalk, ground | 40 | 40 | 40 | 40 |
| Polyaminoamide | 1 | 1 | 1 | 1 |
| Rapeseed oil methyl ester | 20 | 20 | 20 | 20 |
| Diisodecyl phthalate | 10 | — | — | — |
| Diisobutyl phthalate | — | 10 | — | — |
| Alkyl sulfonic acid ester of phenol | — | — | 10 | — |
| Polymer plasticizer based on phthalic acid Diethylene glycol and C$_7$/C$_{11}$ alcohol | — | — | — | 10 |
| Shore hardness "A" | 71 | 66 | 67 | 67 |

In order to be able to subject their gelation behavior of the plastisols to a particularly critical test, the plastisols were gelled with shortened stoving times (17 mins./165° C.). All the plastisol compositions were completely gelled and did not show any exudation of liquid constituents from the plastigel after storage for several days at room temperature.

What is claimed is:

1. Plastisol compositions comprising:
   a plastisol base selected from the group consisting of vinyl chloride homopolymers, vinyl chloride copolymers, methyl methacrylate copolymers, styrene copolymers and mixtures thereof;
   at least one primary plasticizer; and
   at least one secondary plasticizer, wherein said secondary plasticizer comprises a C$_{1-2}$ alkyl monoester of a fatty acid containing at least about 12 carbon atoms.

2. The plastisols of claim 1 wherein said primary plasticizer is selected from the group consisting of C$_6$–C$_{14}$ dialkyl esters of phthalic acid, alkyl benzyl esters of phthalic acid, benzoates of difunctional polyols, benzoates of trifunctional polyols, alkyl sulfonic acid esters of phenol, aryl phosphates, alkylaryl phosphates, C$_6$–C$_{14}$ diesters of aliphatic C$_4$–C$_{10}$ dicarboxylic acids, polymer plasticizers based on diols and dicarboxylic acids and mixtures thereof.

3. The plastisols of claim 1 wherein the ratio of secondary plasticizer to primary plasticizer is from about 0.02:1 to about 2:1.

4. The plastisols of claim 1 wherein the ratio of secondary plasticizer to primary plasticizer if from about 0.07:1 to about 0.6:1.

5. The plastisols of claim 1 wherein the secondary plasticizer is present in an amount from about 14 to about 71 parts by weight per 100 parts of resin (phr).

6. The plastisols of claim 1 further comprising an additive selected from the group consisting of fillers, rheology aids, stabilizers, coupling agents, pigments, blowing agents and mixtures thereof.

7. A process for the production of the plastisols of claim 1 comprising the step of dispersing said plastisol with intensive shearing.

8. The process for the production of the plastisols of claim 7 further comprising a step for pulling a vacuum.

9. Plastisol compositions comprising:
   a plastisol base selected from the group consisting of vinyl chloride homopolymers, vinyl chloride copolymers, methyl methacrylate copolymers, styrene copolymers and mixtures thereof;
   at least one primary plasticizer; and
   at least one secondary plasticizer, wherein said secondary plasticizer comprises a C$_{1-2}$ alkyl monoester of a fatty acid selected from the group consisting of tall oil fatty acids, rapeseed oil fatty acids, linseed oil fatty acids, safflower oil fatty acids and mixtures thereof.

10. The plastisols of claim 9 wherein the primary plasticizer is selected from the group consisting of C$_6$–C$_{14}$ dialkyl esters of phthalic acid, alkyl benzyl esters of phthalic acid, benzoates of difunctional polyols, benzoates of trifunctional polyols, alkyl sulfonic acid esters of phenol, alkyl sulfonic acid esters of aryl phosphates, alkyl sulfonic acid esters of phenol, alkyl sulfonic acid esters of aryl phosphates, alkyl sulfonic acid esters of alkylaryl phosphates, C$_6$–C$_{14}$ diesters of aliphatic C$_4$–C$_{10}$ dicarboxylic acids, polymer plasticizers based on diols and dicarboxylic acids and mixtures thereof.

11. The plastisols of claim 9 wherein the secondary plasticizer is present in an amount from about 14 phr to about 71 phr.

12. The plastisols of claim 9 wherein the ratio of secondary plasticizer to primary plasticizer is from about 0.02:1 to about 2:1.

13. The plastisols of claim 9 wherein the ratio of secondary plasticizer to primary plasticizer is from about 0.07:1 to about 0.6:1.

14. Plastisol compositions comprising:
   a plastisol base selected from the group consisting of vinyl chloride homopolymers, vinyl chloride copolymers, methyl methacrylate copolymers, styrene copolymers and mixtures thereof;

at least one primary plasticizer; and at least one secondary plasticizer, wherein said secondary plasticizer comprises a methyl ester of a fatty acid containing at least about 12 carbon atoms.

15. The plastisols of claim 14 wherein said primary plasticizer is selected from the group consisting of $C_6$–$C_{14}$ dialkyl esters of phthalic acid, alkyl benzyl esters of phthalic acid, benzoates of difunctional polyols, benzoates of trifunctional polyols, alkyl sulfonic acid esters of phenol, aryl phosphates, alkylaryl phosphates, $C_6$–$C_{14}$ diesters of aliphatic $C_4$–$C_{10}$ dicarboxylic acids, polymer plasticizers based on diols and dicarboxylic acids and mixtures thereof.

16. The plastisols of claim 14 wherein the ratio of secondary plasticizer to primary plasticizer is from about 0.02:1 to about 2:1.

17. The plastisols of claim 14 wherein the secondary plasticizer is present in an amount from about 14 to 71 parts by weight per 100 parts of resin (phr).

18. An underbody protection coating comprising the plastisol of claim 9.

19. An adhesive composition comprising the plastisol of claim 9.

20. A seam sealing composition comprising the plastisol of claim 9.

21. An antiflutter adhesive composition comprising the plastisol of claim 9.

22. An anti-vibration compound comprising the plastisol of claim 9.

* * * * *